United States Patent
Cappio et al.

(10) Patent No.: US 9,652,774 B2
(45) Date of Patent: May 16, 2017

(54) SYSTEM AND METHODS FOR SELECTIVE ADVERTISING IN MEDIA CONTENT

(75) Inventors: Adam Bruce Cappio, Seattle, WA (US); Jeffey Ayars, North Bend, WA (US)

(73) Assignee: INTEL CORPORATION, Santa Clara, CA (US)

( * ) Notice: Subject to any disclaimer, the term of this patent is extended or adjusted under 35 U.S.C. 154(b) by 320 days.

(21) Appl. No.: 12/853,153

(22) Filed: Aug. 9, 2010

(65) Prior Publication Data

US 2011/0067115 A1 Mar. 17, 2011

Related U.S. Application Data

(63) Continuation of application No. PCT/US2009/033539, filed on Feb. 9, 2009.

(60) Provisional application No. 61/065,053, filed on Feb. 7, 2008.

(51) Int. Cl.
*H04L 29/06* (2006.01)
*G06Q 30/02* (2012.01)

(52) U.S. Cl.
CPC .................... *G06Q 30/02* (2013.01)

(58) Field of Classification Search
CPC .................................................. G06Q 30/02
USPC ........................................................ 380/201
See application file for complete search history.

(56) References Cited

U.S. PATENT DOCUMENTS 5,594,794 A * 1/1997 Eyer et al. ..................... 380/231
6,020,883 A * 2/2000 Herz et al. .................... 715/721
6,253,193 B1 * 6/2001 Ginter et al. .................. 705/57
6,574,609 B1 * 6/2003 Downs et al. ................. 705/50
6,718,551 B1 * 4/2004 Swix et al. ..................... 725/32
6,834,110 B1 * 12/2004 Marconcini et al. ......... 380/239
(Continued)

FOREIGN PATENT DOCUMENTS

KR 20030020695 A 3/2003
KR 20030020695 A 8/2010

OTHER PUBLICATIONS

Azuki systems, 'Real-Time Multi-Screen Entitlement White Paper [A New Paradigm for Service Providers]', azuki systems, Feb. 2014, entire document, https://www.ericsson.com/assets/local/about-ericsson/company-facts/documents/azuki-multiscreen-entitlement-wp-may2014.pdf.*

(Continued)

*Primary Examiner* — Luu Pham
*Assistant Examiner* — Ronald Baum
(74) *Attorney, Agent, or Firm* — Stoel Rives LLP

(57) ABSTRACT

Embodiments of techniques for distributing and rendering media content are provided. In response to a request for a first media file, a combined media file is generated having first and second segments that together include data from the first media file and from a second media file. The combined media file is then provided to a player module operable to render only data from the first media file during a first operating mode, and operable to render data from both the first and second media files during a second operating mode. For example, the first media file may be a music file, and the second media file an advertisement. A consumer may play the music portion without special software or a license, but the advertisement will be rendered as well. Alternatively, the consumer may purchase a license and use special playback software to render the music without the advertisement.

35 Claims, 5 Drawing Sheets

(56) References Cited

U.S. PATENT DOCUMENTS

| | | | |
|---|---|---|---|
| 6,987,987 B1* | 1/2006 | Vacanti | G06Q 10/087 455/556.2 |
| 7,590,866 B2* | 9/2009 | Hurtado | G06F 21/10 380/201 |
| 7,689,706 B2* | 3/2010 | Jennings | 709/231 |
| 7,761,176 B2* | 7/2010 | Ben-Yaacov et al. | 700/94 |
| 7,802,277 B2* | 9/2010 | Medford | 725/25 |
| 7,836,511 B2* | 11/2010 | Hydrie | G06F 21/10 726/27 |
| 7,885,951 B1* | 2/2011 | Rothschild | 707/709 |
| 7,912,217 B2* | 3/2011 | Baugher et al. | 380/200 |
| 7,983,955 B2* | 7/2011 | Ganz et al. | 705/26.1 |
| 7,987,140 B2* | 7/2011 | Bellwood et al. | 705/59 |
| 8,079,052 B2* | 12/2011 | Chen et al. | 725/88 |
| 8,140,437 B2* | 3/2012 | Kim et al. | 705/51 |
| 8,266,311 B2* | 9/2012 | Virdi et al. | 709/231 |
| 8,306,918 B2* | 11/2012 | Farrugia et al. | 705/57 |
| 8,375,405 B2* | 2/2013 | Morris et al. | 725/34 |
| 8,818,898 B2* | 8/2014 | Schlossberg | G06Q 30/02 482/148 |
| 8,910,045 B2* | 12/2014 | Baum | H04N 21/812 705/14.4 |
| 2001/0034654 A1* | 10/2001 | L. Vigil et al. | 705/14 |
| 2001/0049824 A1* | 12/2001 | Baker et al. | 725/109 |
| 2002/0120564 A1* | 8/2002 | Strietzel | G06Q 20/102 705/40 |
| 2002/0156852 A1* | 10/2002 | Hughes et al. | 709/206 |
| 2002/0172366 A1* | 11/2002 | Peterka et al. | 380/277 |
| 2002/0194601 A1* | 12/2002 | Perkes et al. | 725/44 |
| 2003/0001887 A1* | 1/2003 | Smith, IV | 345/741 |
| 2003/0048293 A1* | 3/2003 | Werkhoven | 345/738 |
| 2003/0078853 A1* | 4/2003 | Peinado et al. | 705/26 |
| 2003/0110130 A1* | 6/2003 | Pelletier | G06Q 30/02 705/50 |
| 2003/0110171 A1* | 6/2003 | Ozer et al. | 707/10 |
| 2003/0167202 A1* | 9/2003 | Marks et al. | 705/14 |
| 2003/0226151 A1* | 12/2003 | Hamada et al. | 725/132 |
| 2004/0003398 A1* | 1/2004 | Donian et al. | 725/34 |
| 2004/0010417 A1 | 1/2004 | Peled | |
| 2004/0024688 A1* | 2/2004 | Bi et al. | 705/37 |
| 2005/0111662 A1* | 5/2005 | Fiedler | 380/201 |
| 2005/0169467 A1* | 8/2005 | Risan et al. | 380/201 |
| 2006/0029093 A1 | 2/2006 | Van Rossum | |
| 2007/0120925 A1* | 5/2007 | Belelie et al. | 347/100 |
| 2007/0162335 A1 | 7/2007 | Mekikian | |
| 2007/0168288 A1* | 7/2007 | Bozeman | 705/51 |
| 2007/0211891 A1* | 9/2007 | Shamoon | H04L 63/0428 380/28 |
| 2007/0214252 A1* | 9/2007 | Kushima | 709/223 |
| 2008/0077483 A1* | 3/2008 | Hollo et al. | 705/14 |
| 2008/0154951 A1* | 6/2008 | Martinez et al. | 707/103 Y |
| 2009/0006265 A1* | 1/2009 | Elias | G06Q 50/188 705/80 |
| 2009/0083225 A1* | 3/2009 | Jacobs et al. | 707/3 |
| 2010/0293049 A1* | 11/2010 | Maher | G06F 17/30699 705/14.46 |
| 2010/0325737 A1* | 12/2010 | Fahn | G06F 21/10 726/28 |

OTHER PUBLICATIONS

OOYALA.com, 'Protecting and Monetizing Premium Content', OOYALA.com, Dec. 28, 2016, entire document, http://go.ooyala.com/rs/OOYALA/images/ooyala-content-protection-whitepaper.pdf.*

PCT/US2009/033539, International Search Report and Written Opinion, Aug. 25, 2009, 7 pages.

* cited by examiner

SYSTEM AND METHODS FOR SELECTIVE ADVERTISING IN MEDIA CONTENT

CROSS-REFERENCE TO RELATED APPLICATIONS

The present application is a continuation of and claims priority benefit from copending International Application PCT/US2009/33539, entitled "Selective Advertising in Media Content", with an international filing date of Feb. 9, 2009; which claims priority benefit from U.S. Provisional Patent Application Ser. No. 61/065,053, filed Feb. 7, 2008; and which to the extent not inconsistent with disclosure herein, are incorporated by reference herein in their entirety.

BACKGROUND

A provider of digital media content may allow a consumer to purchase the right to use the media content in a particular authorized manner, and may employ a content-protection scheme to prevent the consumer from using the content in an unauthorized manner.

Examples of media content include content digitally represented by a media file contains video data, audio data, text data, or any combination thereof, and that may be accessed or distributed as a single digital file, a group of digital files, or as a data stream, i.e., via streaming.

Examples of an authorized manner in which a consumer may use a media file include immediate audio or video playback (e.g., streaming) and copying and storing the file (e.g., on a computer disk, MP3 player, or other storage device) for future playback.

An example of a content-protection scheme includes providing the media file in a proprietary format that can be rendered only by special playback software, for example software supplied by the provider. Examples of such file formats and corresponding playback software include Apple's® Apple Lossless®format, which only Apple's® iTunes® software can render, and RealNetworks'® RealAudio® format, which only RealNetworks'® RealPlayer® can render. The types of protection provided by this scheme may include ensuring that the content provider has paid a fee to encode files in the proprietary format, that the consumer has paid a fee for the rendering software or rendering device, or that both the provider and consumer have respectively paid these fees.

Another example of a content-protection scheme is a digital-rights-management (DRM) system, which includes a license for an authorized use of the media file, and DRM software that compares the consumer's attempted use of the media file with the use authorized by the license. If the consumer's attempted use of the media file is not authorized, then the DRM software prevents the attempted use. The DRM system is typically incorporated within the consumer's playback device.

Protection schemes such as those discussed above are designed to ensure that the content provider is compensated for all of a consumer's uses of a media file by preventing uses for which the consumer has not paid.

Unfortunately, the proprietary nature of many of today's protection schemes may limit the applications in which they may be used, and may limit content choices for consumers. For example, Apple's® iTunes® software cannot render media files that are in another proprietary format, such as RealNetworks'® RealAudio® format, and iTunes®-compatible content libraries may not have the same content available that RealAudio®-compatible content libraries have available. Therefore, if a specific media content item, such as a music recording, is unavailable as an iTunes®-compatible media file, an iTunes® user may be unable to purchase the music recording for use with iTunes®. Furthermore, certain DRM systems may need to communicate with the content provider or other external authority to confirm or update the consumer's license with respect to a media file, and may do so using encryption and/or other validation techniques. If a communication path between the content renderer and the external authority is unavailable, then a consumer may be unable to use the media file until a communication path becomes available. And even if a communication path is available, the time required to execute the decryption and/or validation may cause a noticeable delay to the consumer when he or she attempts to use the media file.

DETAILED DESCRIPTION

Figure 1:
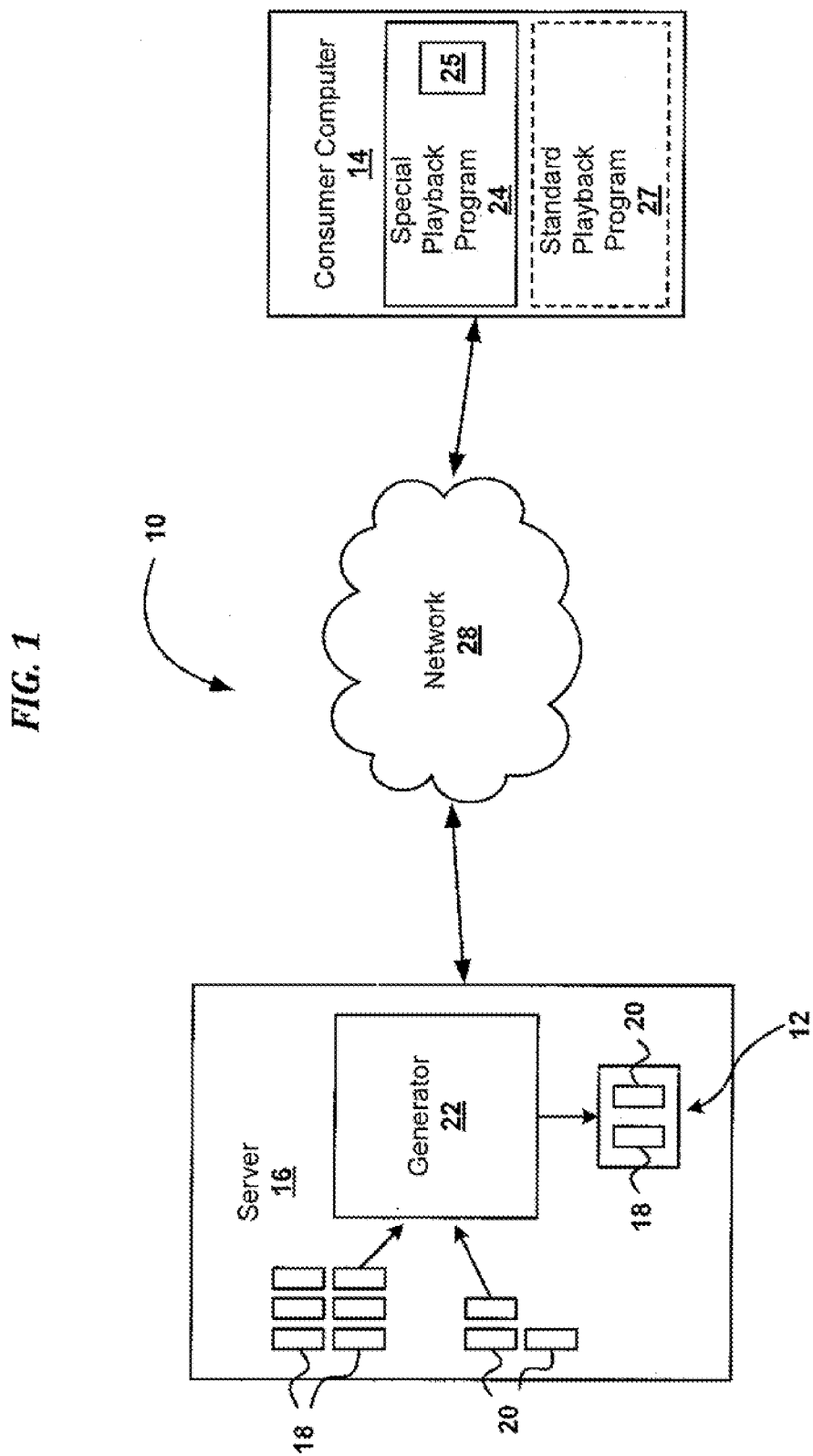
FIG. 1 is a schematic diagram of an embodiment of a system for distributing and rendering digital media content.

In an embodiment, a combined media file includes a first segment having data that represents media content that a consumer desires to use, and includes a second segment having data that represents advertising content that the provider (or the advertiser who paid the provider to include the advertising content in the combined media file) wants the consumer to perceive. For example, if the combined media file is an audio file, then the data in the first segment may represent a song, and the second segment may represent an audio advertisement for a consumer product (e.g., soda or an automobile) such as one would hear on the radio.

When the combined media file is played, either the first segment is played alone, or both the first and second segments are played in a predetermined order (e.g., the second, advertising segment first). If the consumer utilizes a special playback program and has purchased or has otherwise acquired a license to play the first segment (the music) alone, then the special playback program suppresses the second segment (the advertising content) when rendering the combined media file. For example, such a license may be included with membership in a content subscription service offered by the provider. If, however, the consumer does not have a license to play the first segment alone, or does not utilize the special playback program, then both the first and second segments of the media file are played.

Such a combined media file may benefit both the content provider and the consumer.

Because the combined media file may be rendered by either the special playback program or by a standard playback program, and may be rendered with or without the advertising content in the second segment depending on the existence of a user's license, the content provider may derive revenue in either circumstance. That is, if a consumer utilizes the special playback program and has purchased a license to enable playback without the advertising content, then the content provider derives revenue in the form of the consumer's license fee. If, however, the consumer utilizes a standard playback program to render the combined media file, and/or has not purchased a license, then the content provider derives revenue from selling the advertising content rendered when the second segment of the media file is played.

Furthermore, because more consumers may choose to use a media file when there is a no-license option, the content provider may experience an overall increase in revenue from use of the media file as compared to license-only access.

But by also allowing a consumer the option to suppress the advertising, the provider may still retain higher-end customers who are both willing to pay (or to pay more) for a license to use the media file and to use a dedicated renderer, i.e., a special playback program, to do so.

Moreover, by including the advertising content in the media file but allowing suppression of that content under certain circumstances, the provider need not make available multiple versions (i.e., separate versions with and without the advertising content) of the media file.

A consumer may also benefit from a combined media file, because the media content he desires may be rendered even in the absence of special playback software or of a purchased license. So, for the "price" of perceiving advertising, the consumer may render a media file that he might otherwise have been unable to render without special playback software or a license. In addition, consumer frustration may be mitigated by not preventing a consumer's use of a media file merely because a standard playback program is being used or because a license has not been purchased.

As used herein, the term "license" generally refers to any access control mechanism or policy, including requirements for use and/or the scope of the use, associated with access to a media file. A license may be defined or created with the aid of a DRM system. In such cases, the license may be referred to as being predefined or preconfigured under the DRM system, and the media file associated with the license may be referred to as being governed by the license or DRM system. The license, as well as any media files governed thereby, may or may not be encrypted. Furthermore, the license may be stored in the same system as a media file governed by the license, or in a different system. For example, the license may be created remotely and then delivered to a consumer's computer or other playback device and stored locally. In another example, the license may be stored on a remote system, and the consumer's computer or other playback device may thereafter verify with the remote system the appropriate permission to render the associated media file.

FIG. 1 is a diagram of an embodiment of a system 10 for distributing and rendering media content. The system 10 includes a consumer computer 14, and includes a server 16 for storing a plurality of media files 18 and 20. Consumer computer 14 and server 16 are connected to each other via a computing network 28, where the connectivity between the network and the server, and between the network and the consumer computer, may be, for example, via modem, Ethernet (IEEE 802.3), Token Ring (IEEE 802.5), Fiber Distributed Datalink Interface (FDDI), or Asynchronous Transfer Mode (ATM). The connectivity between the server 16 and the network 28 need not be via the same device or protocol as the connectivity between the consumer computer 14 and the network. Furthermore, computing devices in the network 28, the consumer computer 14, and the server 16 may be desktop, server, portable, hand-held, set-top, or any other desired type of device configuration.

The consumer computer 14 and the server 16 may each have one or more input devices. Examples of such input devices include a keyboard, trackball, pen and stylus, mouse, voice-recognition system, a touch screen, or any combination thereof.

Furthermore, the consumer computer 14 and the server 16 may be used in connection with various operating systems such as: UNIX, LINUX, Disk Operating System (DOS), OS/2, Palm OS, the Macintosh operating system, OSX, VxWorks, Windows 3.X, Windows 95, Windows 98, Windows NT, Windows ME, Windows Mobile, Windows XP, and Windows Vista.

The network 28 may include the public Internet, a private network within or outside of the Internet, a secure network within or outside of the Internet, a public network, a value-added network, an intranet, and the like. Examples of networks other than the Internet include a local area network (LAN) and a wide area network (WAN).

Each media file 18 includes digital data that represents consumer-desired content, such as audio (e.g., music) or audiovisual content, and each media file 20 includes digital data that represents advertising content.

The server 16 includes and is operable to execute a generator program 22, which is operable to combine one or more of the consumer-desired media files 18 with a respective one or more of the advertising media files 20 to generate a combined media file 12 containing both a content media file 18 and an advertising media file 20. That is, the media file 18 composes a first segment of the combined media file 12, and the advertising media file 20 composes a second segment of the combined media file. The media files 18 and 20 and the combined media file 12 may include any media content in any desired form such as video, audio, graphics, text, or any combination thereof. Examples of the combined media file 12 are discussed below in conjunction with FIGS. 2, 3, and 5.

The consumer computer 14 includes a special playback program 24 to render the combined media file 12 received from the server 16. The special playback program 24 includes an authorization module 25 for determining whether the consumer has a valid license for the combined media file 12, and therefore whether the special playback program is to play the second segment of the combined media file (corresponding to advertising media file 20) when the special playback program renders the combined media file. In an embodiment, the consumer computer 14 may also include a standard playback program 27, or may include the standard playback program without also including the special playback program 24. While both the special playback program 24 and the standard playback program 27 are operable to render the combined media file 12, the standard playback program does not include the authorization module 25.

The generator program 22, the special playback program 24, the authorization module 25, and the standard playback program 27 may each comprise a plurality of components or modules implemented in hardware, in firmware, and/or in software that is embodied in hardware, firmware, or a tangible computer-readable medium. These components or modules may comprise various sub-routines, procedures, definitional statements, and macros. If the components or modules are implemented in software embodiments, they may be written in any scripting or programming language such as C, C++, BASIC, Pascal, Java, JavaScript, Perl, Ruby, Python, and Fortran and executed by any appropriate operating system. The processes associated with these components or modules may be arbitrarily redistributed to other components or modules, combined together in a single component or module, or made available in a shareable dynamic link library.

Still referring to FIG. 1, in operation of the system 10, when a consumer requests a desired media file 18, the generator program 22 combines one or more advertising media files 20 with the desired media file 18 to generate the combined media file 12 for providing to the consumer. Determining which advertising media file(s) 20 is (are) combined with the requested media file 18 may be accomplished in a variety of ways. For example, the generator program 22 may randomly select the advertising media file 20 at the time that the combined media file 12 is generated. Alternatively, advertisers may pay different amounts for the placement of an advertising media file 20 based on the popularity of a particular media file 18 with which it is combined. For example, a content provider may charge an advertiser a higher fee for combining an advertising media file 20 with a media file 18 when that media file represents a song that is listed within the Billboard® Top Ten (a prominent tracking service for popular music) for the previous week or month. The generator program 22 therefore selects one of these higher-fee media files 20 for combining with a top-ten song. In addition, the matching of an advertising media file 20 with a particular media file 18 may be based on a perceived or previously-determined correlation between audience characteristics for the media file 18 and a targeted demographic group for a particular advertising media file 20. For instance, a song from the teen band 'The Jonas Brothers" may be intentionally paired with an advertisement for a brand of hair spray marketed to teen-aged female consumers.

The consumer request for a media file 18 is transmitted from the consumer computer 14 to the server 16 via the computer network 28. Similarly, the combined media file 12 is distributed to the consumer computer 14 from the server 16 via the computer network 28. The server 16 may provide the combined media file 12 to the consumer upon the consumer's request alone, or after the consumer submits money, information, or any other specified items to the provider. Once the server 16 transmits the combined media file 12, the special playback program 24 may render the combined media file either by playing only the first segment of the combined media file (the segment that includes the data representing requested media file 18), or by playing back both the first segment and the second segment (which includes the data representing advertising media file 20) as discussed below in conjunction with FIGS. 3-5. Alternatively, the standard playback program 27 may render the combined media file 12 by playing both segments of the file.

Other techniques for distributing the combined media file 12 are possible. For example, the file may be streamed to the consumer computer 14 while either the special playback program 24 or the standard playback program 27 is rendering the file. As another example, the combined media file 12 may be distributed via a removable storage medium such as a compact disc, floppy disk, MiniDisc, DAT, removable hard drive, portable flash drive, and the like. The combined media file 12 may also be distributed by a peer-to-peer file sharing system, such as Gnutella®, Limewire®, BitTorrent®, or other such systems.

Figure 2:
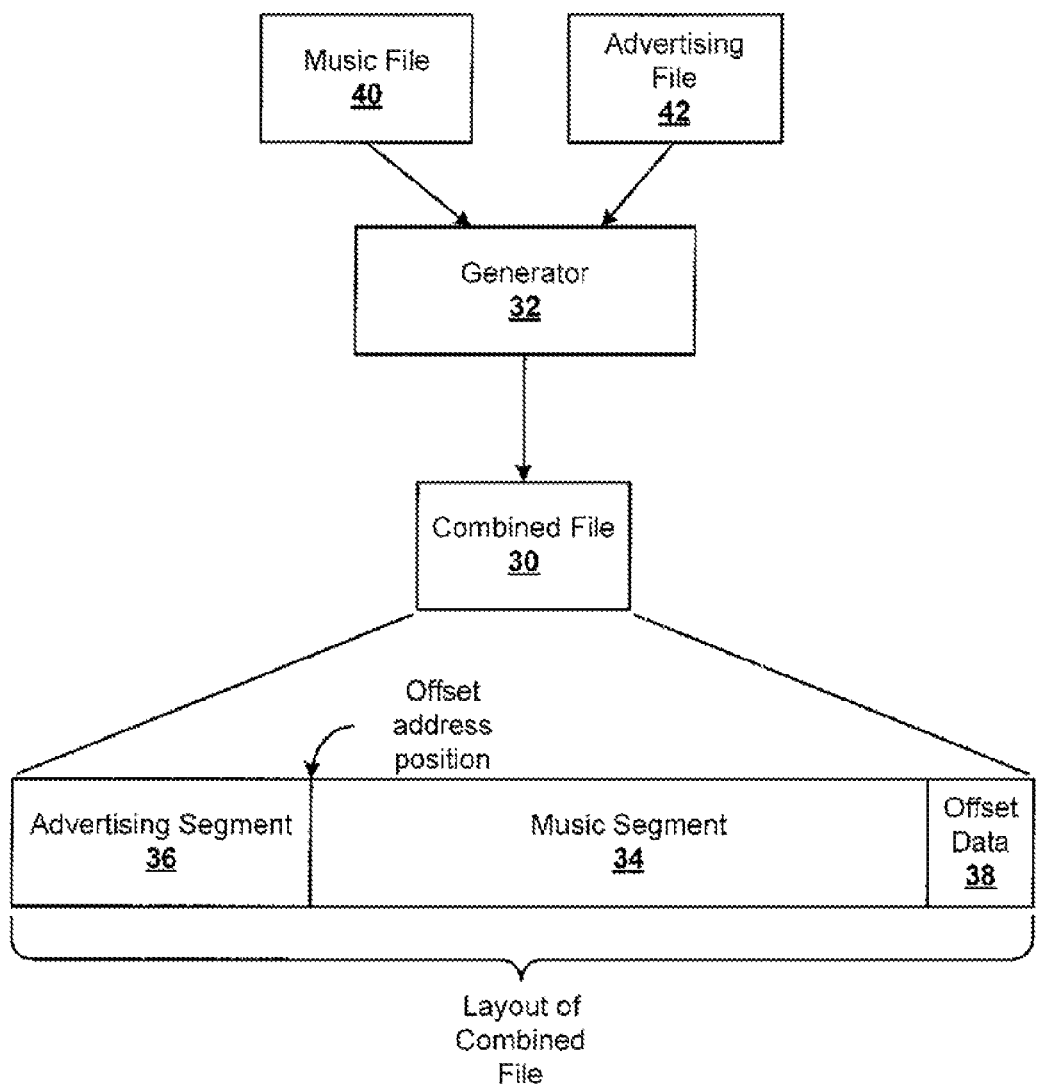
FIG. 2 is a diagram of an embodiment of media content in the form of a combined audio file, and of an embodiment of a program that can generate the audio file.

FIG. 2 is a diagram of an embodiment where the combined media file 12 of FIG. 1 is a combined audio file 30 in the MP3 format, and of an embodiment of a generator program 32 that generates the combined audio file.

The combined audio file 30 includes a first segment 34 with data representing a consumer-desired music file 40, a second segment 36 with data representing an audio advertising file 42, and a third segment 38 with data that identifies the location, in the form of an offset address, of the music segment 34 within the combined audio file 30. The offset address data in the third segment 38 may be encrypted or otherwise protected to hinder a consumer's attempt to extract the offset data, to discover the location of the music segment 34, and to suppress the advertising segment 36 without authorization.

The generator program 32 is operable to combine, as desired, one or more consumer-desired music files 40 (only one shown) with one or more advertising files 42 (only one shown) to generate the combined audio file 30. For example, the generator program 32 may combine the two media files 40 and 42 by placing the data from the advertising file 42 before (or, in another embodiment, after) the data from the music file 40. In this way, when a standard playback program (such as the standard playback program 27 in FIG. 1) plays back the combined audio file 30, it plays the contents of the advertising file 42 before playing back the music file 40, thus increasing the chances that the consumer will listen to the contents of advertising file. The generator program 32 then generates offset address data that may instruct a special playback program (such as the special playback program 24 in FIG. 1) how to render only the music segment 34, and creates a third segment 38 containing the offset address data.

In an embodiment, the generator program 32 receives audio files 40 and 42 as uncompressed WAV files, encodes each WAV file using an MP3 audio codec, concatenates the two encoded files, determines the address in the combined audio file 30 where the second segment 34 (containing music file 40) begins, and stores this offset address data in the third segment 38.

In another embodiment, the consumer-desired music file 40 may be received by the generator program 32 already encoded into an MP3 or other compressed audio format, and the advertising file 42 may similarly be encoded when received.

In still another embodiment, the generator program 32 may encode the advertising file 42 to match the encoding of the music file 40 before generating the combined audio file 30 from the two component files 40 and 42.

In yet another embodiment, the generator program 32 may combine the two audio files 40 and 42 by mixing the data from the advertising file 42 with the data from the music file 40 so that it may be more difficult for a consumer to locate a boundary between the two files. For example, the combined audio file 30 may include a series of 30-second segments, where the odd-numbered segments each include a respective portion of the advertising file 42, and the even-numbered segments each include a respective portion of the music file 40. If the combined audio file 30 is mixed in this or in a similar manner, then the location data in the third segment 38 of the audio file includes instructions for a special playback program to render only the segments including portions of the music file 40, and includes instructions for a standard playback program (or unauthorized special playback program) to render either all of the advertising content before or after all of the music content, or in some other desired sequence.

In yet another embodiment, the third segment 38 may include instructions such that a special playback program may render portions of the advertising content before or after all of the music content, or in some other desired sequence, even without the generator program 32 explicitly sequencing the combined file 30 in a corresponding order. For example, if a user does not possess a valid license for the combined file 30 (and is therefore not authorized to suppress the advertising content in segment 36), the special playback program 24 may, according to instructions in the third segment 38, render a portion of the advertising segment before rendering the music segment 34 and render another portion of advertising segment after the music segment is rendered. A standard playback program may play back the combined file 30 in the same manner as an unlicensed special program.

Figure 3:
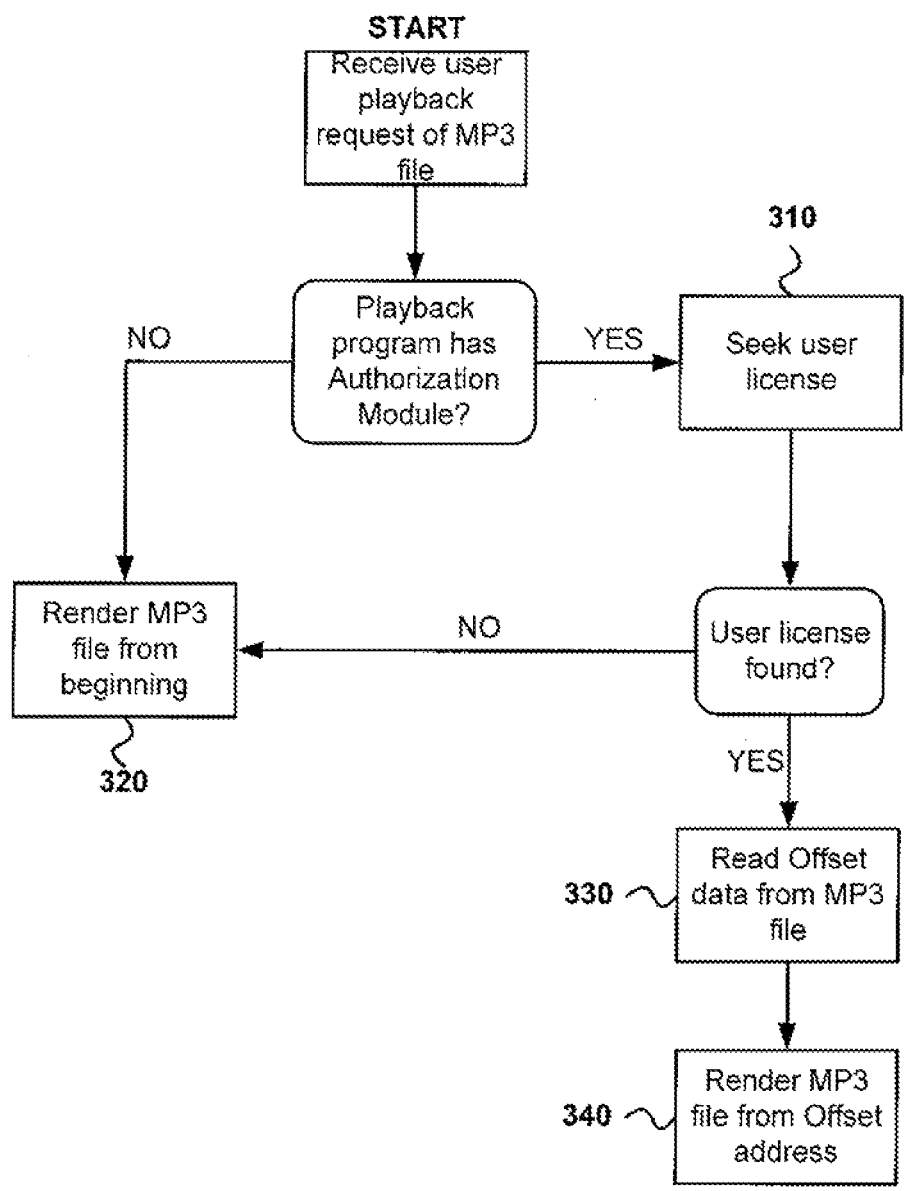
FIG. 3 is a flowchart depicting an embodiment of a method for rendering the audio file of FIG. 2.

FIG. 3 is a flowchart depicting an embodiment of a method for rendering the combined audio file 30 of FIG. 2.

Figure 4A:
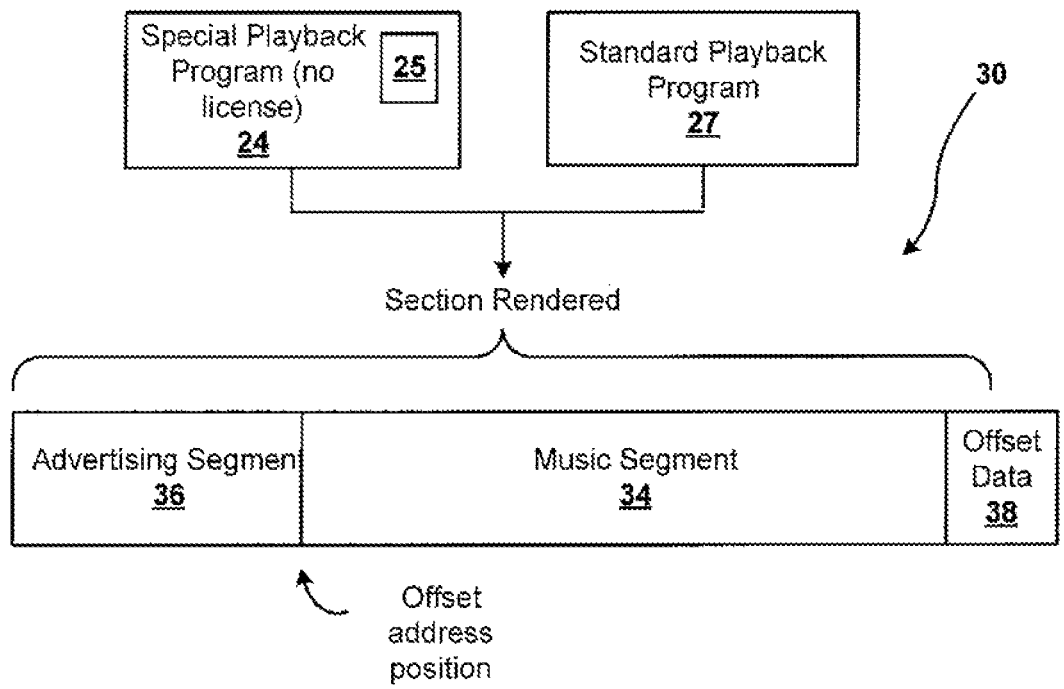
FIGS. 4A and 4B are diagrams of the rendering modes of FIG. 3.
Figure 4B:
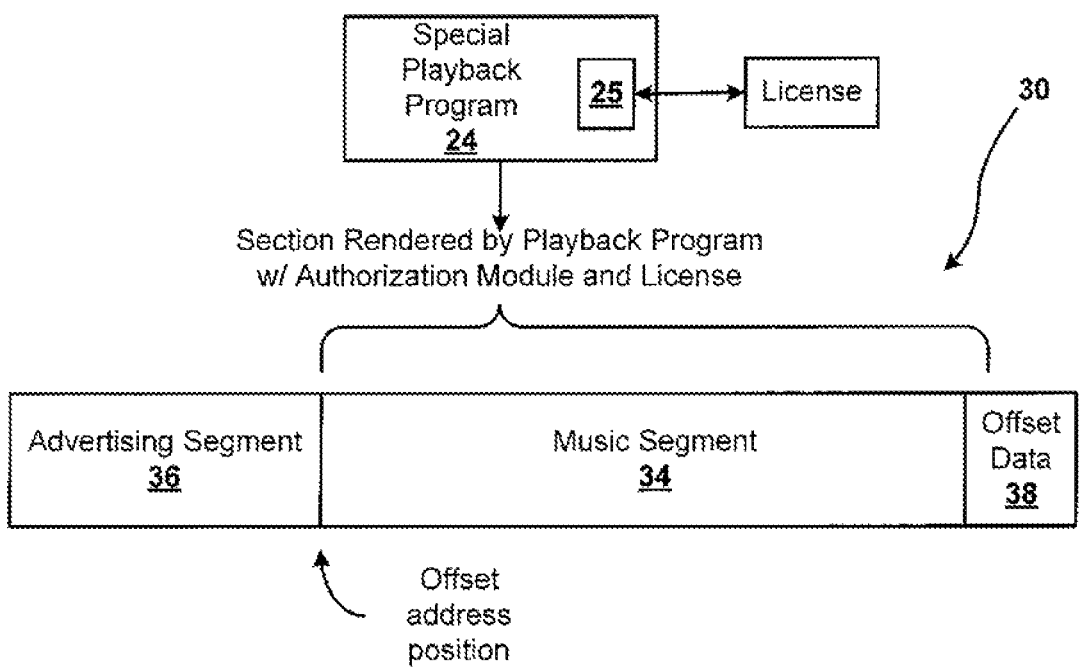

FIGS. 4A and 4B are diagrams of the respective rendering modes of FIG. 3.

Referring to FIGS. 3-4B, when a consumer wants to play the combined audio file 30 to listen to the music in the first segment 34, the consumer can use any desired playback program. Depending on the playback program used, and whether the consumer is authorized to omit playing back the advertising content in the file 30, the playback program may either render only the second segment 34 (containing data representing the music file 40), or the data in both the first and second segments 34 and 36.

Referring to FIG. 3, beginning from START, a playback program receives a user request to render a combined audio file 30 to which the playback program has access, either via local storage, data streaming, or network transmission. If the playback program has a compatible authorization module (such as authorization module 25 in FIGS. 2 and 4B), then the method proceeds to step 310 and determines whether the user has a license for the particular combined audio file 30 (or for the music file 40 of FIG. 2) to be rendered. If the consumer has no such license, or if the playback program does not possess a compatible authorization module (such as with the standard playback program 27 depicted in FIG. 4A), then the method proceeds to step 320.

In step 320, the playback program renders the combined file 30 from the beginning. That is, per FIG. 4A, both the music segment 34 and the advertising segment 36 are played in sequence (with the advertising segment playing before the music segment, after the music segment, or in some other sequence depending on the order determined by the generator program 32 of FIG. 2 when the combined file 30 was created). If, however, the consumer has a license for the combined file 30, then the special playback program 24 proceeds to step 330, and reads (and possibly decrypts, if necessary) the offset address data from the third segment 38 (FIGS. 2 and 4A-4B) in the combined file. Once the special playback program 24 has read the offset address data, it proceeds to step 340.

In step 340, and as depicted in FIG. 4B, the special playback program renders the combined file 30, but rather than rendering the file from the beginning, it begins playing the file starting at the offset address, which is the start address for the music segment 34. In this way, the special playback program 24 suppresses the content of the advertising segment 36 so that the consumer hears only the contents of the music segment 34.

Still referring to FIGS. 2-4B, a similar protocol may apply when a consumer wants to use the combined audio file 30 in a different manner. For example, suppose a consumer wants to make a copy of the combined audio file 30. If the consumer has a license authorizing her to make a copy of the content in music file 40 (FIG. 2), and if the program used to make the copy has an authorization module 25, then the consumer may use that program to make a copy of the music file 40 that does not include the advertising file 42. However, if the combined audio file 30 is not copy-protected and the consumer uses a program with an unlicensed authorization module or a program without an authorization module to make the copy, then the program can make a copy of only the entire combined audio file 30, which includes both the advertising segment 36 and the music segment 34.

In another embodiment, a consumer may be authorized to play the combined audio file 30 without the advertising content, but not permitted to make a copy of the combined audio file 30 that does not include the advertising segment 36. Any copies the consumer makes will include the advertising content, but as long as her license remains valid and she uses a special playback program to render those copies, she will never actually hear that advertising content. Of course, if at some point the consumer's license becomes invalid (for example, if the license expires after a predetermined time) then all of her subsequent uses of the combined audio file 30 would revert to include playback of the advertising content.

In yet another embodiment, the special playback program 24 includes a tracking module (not shown) for tracking the advertising files 20 rendered over time as part of multiple combined audio files 30. This module may be separate from or included within the authorization module 25. The information tracked by the tracking module may include the title of the rendered advertising file, an advertising file ID, which combined file(s) 30 incorporated the advertising file, how many times the advertising file was rendered, with which media files 40 the advertising file 42 was paired, and so on. This information may be sent to the content provider under a number of circumstances. For example, the tracking module may store such information on the consumer computer 14 or other playback device and send such information to the content provider at regular intervals or whenever the consumer send a request for a media file to the server 16 (FIG. 1). If the playback device is, for example, an MP3 player, then the tracking module may store this information on the player, and cause the player to upload this information to the consumer computer 14 when the MP3 player is connected to the computer. Then, the tracking module on the MP3 player, or a similar module on the consumer computer 14, may cause the computer to upload this information to the server 16 the next time that the computer is connected to the network 28.

Although the combined media file 30 is discussed as being an audio file with music and advertising segments, other embodiments of the combined media file are contemplated. For example, the combined media file 30 may include a video content segment in addition to or instead of the music segment, and may include a video advertising segment in addition to or instead of the audio advertising segment. The structure of such a combined media file with one or more video segments may be similar to the structure of the combined audio file 30 described above in conjunction with FIGS. 2-4B, where the advertising segment 36 precedes, follows, or is interleaved with the consumer-desired content of segment 34. In another embodiment, such as that described below with respect to FIG. 5, the consumer-desired video content and advertising content may be rendered simultaneously.

Figure 5:
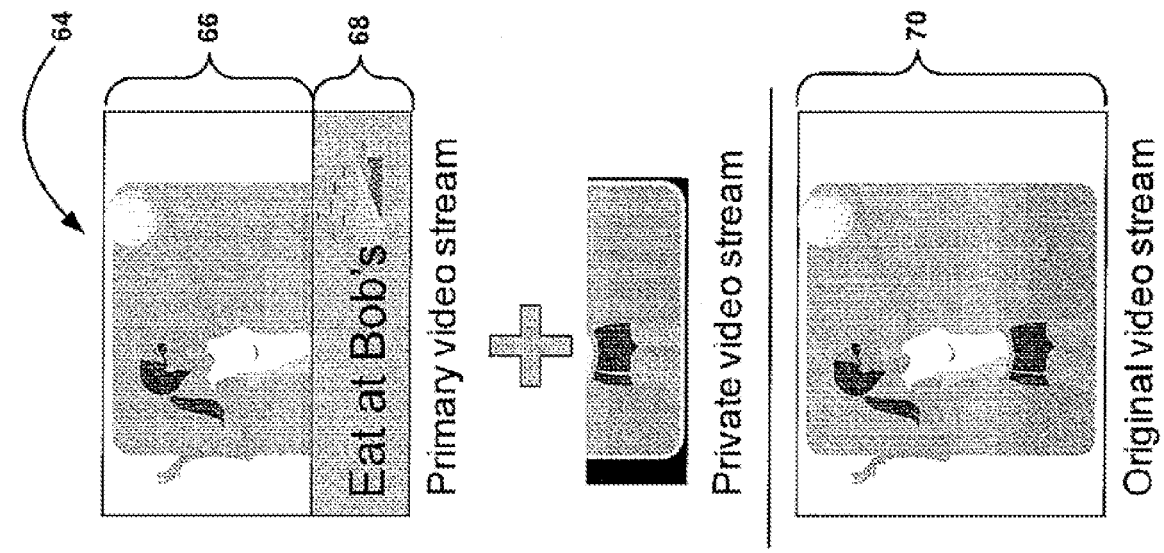
FIG. 5 is a diagram of an embodiment of media content in the form of a combined video file, and of an embodiment of a program that can generate the video file.
Figure 5:
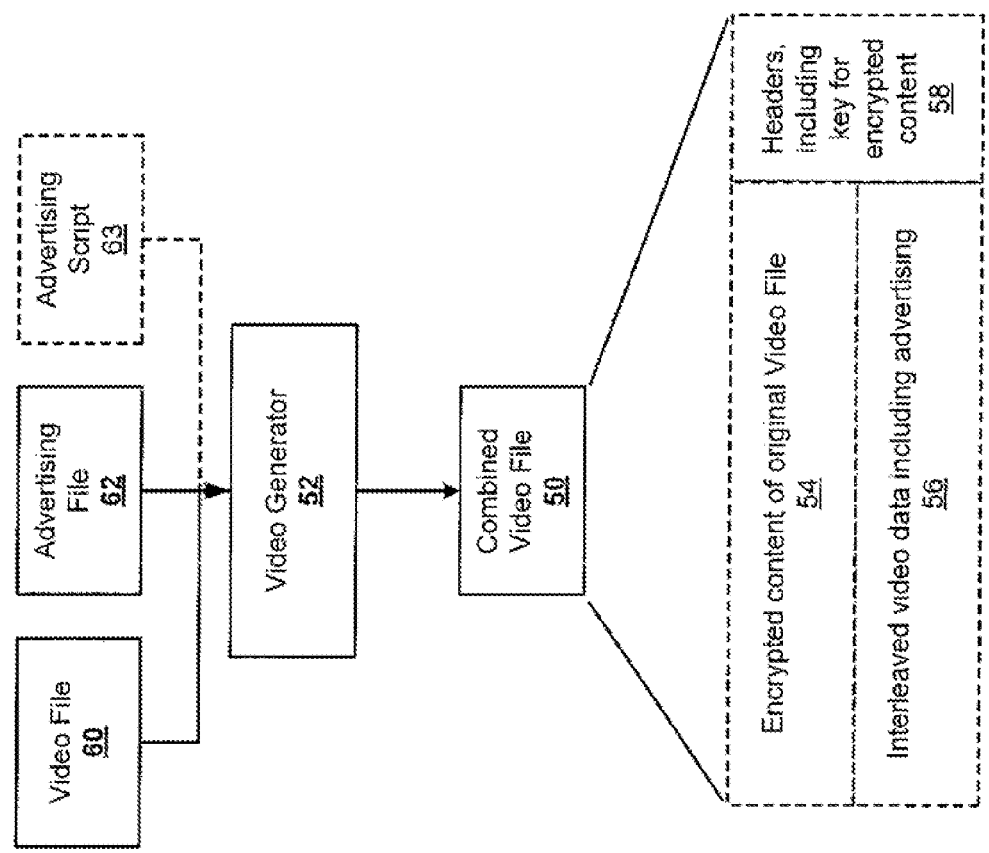

FIG. 5 is a diagram of an embodiment where the combined media file 12 of FIG. 1 is a combined video file 50, and of an embodiment of a generator program 52 that generates the combined video file.

The combined video file 50 includes a first segment 54, which includes data representing a first portion of a consumer-desired video file 60, and includes a second segment 56, which includes data representing the remainder of the consumer-desired video file 60 spliced with an advertising file 62. Optionally, textual or graphical data from an advertising script file 63 may be used to overlay the data in the advertising file 62 and then spliced with the consumer-desired video file 60 to form the second segment 56. In this way, text or graphics for advertising content may be customized without needing to utilize a separate advertising video file 62. For example, an advertisement for a local car dealership may include both video content from a national automobile manufacturer, such as new car models racing around a desert track, and static content related to the local dealership, such as a local phone number and credit terms for purchasing an automobile. The advertising video file 62 may contain the video content showing the new cars from the manufacturer, while the advertising script file 63 may contain the static textual or graphical information regarding the local car dealership. For the remainder of this discussion, it shall be understood that when the advertising file 62 is used in generating the combined video file 50, the advertising file may also include data from the advertising script 63.

The generator program 52 is operable to combine, as desired, one or more consumer-desired video files 60 (only one shown) with one or more advertising files 62 (only one shown) to generate the combined video file 50. The generator program 52 may combine the files 60 and 62 by first splitting the consumer-desired video file 60 into two portions. For example, one of the portions contains data representing the upper half of each frame in the video file 60, and the other portion contains data representing the lower half of each frame. The generator program 52 then combines one of the portions of the video file 60 with the advertising file 62. For example, the generator program 52 lays the advertising file 62 over the lower half of the video content in the video file 60.

Next, the program 52 places data representing the portion of the consumer-desired video file 60 that is not combined with the advertising file 62 into the first segment 54 of the combined video file 50, and places data representing the portion of the consumer-desired video file that is combined with advertising file in the second segment 56 of the combined video file.

Then, program 52 generates data that includes instructions and possibly decryption data that enables a special playback program (such as the special playback program 24 in FIG. 1) to render the first video segment 54 (which contains no data from advertising file 62). The generator program 52 adds this enabling data to the combined video file 50 as a third segment 58. The data in the third segment 58 may be encrypted or otherwise protected to hinder a consumer's unauthorized attempt to suppress the advertising within the second segment 56. The data in the third segment 58 may comprise instructions, resources (such as license and/or decryption data and/or encoded digital audio/video data), references to resources embodied in XML, SMIL, or another other markup language, or any combination of the above.

When a consumer uses a standard playback program, or a special playback program without a valid license for the combined video file 50, the playback program renders the data in the second segment 56 of the file 50, and the consumer perceives the video as exemplified in the snapshot picture 64. The picture 64 includes a portion 66 (here an upper portion) of display data from the consumer-desired video file 60, and also includes a portion 68 (here the lower portion) of display data from containing the advertising file 62. The portion 68 may be displayed for either the entire duration of the consumer-desired video file 60, or may only be displayed for a portion of that duration. Furthermore, the portion 68 may remain in the same location relative to the portion 66 of the video frames, or the portion 68 may move relative to the portion 66 as the video file 50 is played.

Alternatively, when the consumer is authorized to avoid rendering the advertising file 62, a special playback program containing authorization module 25 (FIG. 1) reads the data in the third segment 58, and uses that data to splice the data in the first segment 54 of the combined video file 50 with the data in the second segment 56 to generate the video as exemplified by the snapshot 70. That is, the playback program generates the video by retrieving the data representing the upper frame portion 66 from the second segment 56, and by retrieving the data representing the lower frame portion 68 from the first segment 54. In this way, the consumer perceives the video without any advertising, as exemplified in the snapshot picture 70. Furthermore, storing only the lower frame portions 68 of the video file 60 in the first segment 54 reduces the size of the first segment as compared to storing the frames of the video file in their entireties.

While the above detailed description has shown, described, and pointed out novel features of the disclosed subject matter as applied to various embodiments, it will be understood that various omissions, substitutions, and changes in the form and details of the device or process illustrated may be made by those skilled in the art without departing from the spirit of the disclosed subject matter.

What is claimed is:

1. A server for distributing media content over a network, the server comprising:
   a communication device configured to receive, from a client over a network, a request for a first media file, the first media file comprising consumer desired media content comprising one or more of audio content and visual content;
   a computing device configured to, using a processor, generate from the first media file and from a second media file a combined media file comprising:
   one or more first segments that include media content from the first media file,
   one or more second segments that include data from the second media file,
      wherein the one or more second segments are mixed with the one or more first segments such that unauthorized rendering of the combined media file results in rendering of both the media content from the first media file and the data from the second media file,
      wherein the second media file comprises advertising content, and
      wherein the media content of the first media file included in the one or more first segments is not included in the one or more second segments, and
   a third segment that includes offset data that identifies a location within the combined media file of the one or more first segments and that, during authorized rendering of the combined media file, enables rendering of the media content of the first media file without rendering the data from the second media file,
      wherein at least a portion of the data included in the third segment is encrypted;

wherein the third segment is inaccessible by a player when a user does not have authorization such that unauthorized rendering of the combined media file comprises rendering of both the media content from the first media file and the data of the second media file, and wherein the data of the second media file and a portion of the media content of the first media file of the combined media file is renderable by the player incapable of accessing the third segment; and wherein the communication device is further configured to provide the combined media file over the network to the client in response to the request, for rendering the combined media file at the client.

2. The server of claim 1 wherein the one or more first segments together contain all of the consumer-desired media content from the first media file and the one or more second segments together contain all of the advertising content from the second media file.

3. The server of claim 1 wherein the third segment includes data indicating the location of the one or more first segments within the combined media file.

4. The server of claim 1 wherein the computing device is further configured to arrange the combined media file such that at least one of the one or more second segments precedes at least one of the one or more first segments within the combined media file.

5. The server of claim 1 wherein the one or more first segments contain data from only the first media file, and the one or more second segments contains data from both the first and second media files.

6. The server of claim 1 wherein the data included by the one or more first segments is encrypted, and the third segment includes data related to the decryption of data within the one or more first segments.

7. The server of claim 1, wherein the computing device is further configured to select the second media file from a plurality of available media files based on a set of criteria.

8. The server of claim 7 wherein the set of criteria includes information related to the consumer-desired media content of the first media file.

9. The server of claim 7 wherein the set of criteria includes information related to the advertising content of the second media file.

10. The server of claim 7 wherein the set of criteria includes one or more characteristics of a user issuing the request for the first media file.

11. The server of claim 1 wherein the combined media file comprises a video file, and wherein generating the combined media file comprises generating the one or more second segments comprising a video frame, the video frame comprising a portion of a video frame from the first media file and a portion of data from the second media file.

12. The server of claim 1 wherein generating the combined media file comprises generating a combined media file of a same media type as the first media file.

13. The server of claim 12 wherein generating the combined media file comprises generating a combined media file of a same format as the first media file.

14. A method for distributing media from a server, the method comprising:

receiving a request for a first media file from a client over a network, the first media file comprising consumer-desired media content comprising one or more of audio content and visual content;

generating, using a processor, from the first media file and from a second media file a combined media file comprising:

one or more first segments that include media content from the first media file, one or more second segments that include data from the second media file, wherein the one or more second segments are mixed with the one or more first segments such that unauthorized rendering of the combined media file results in rendering of both the media content from the first media file and the data from the second media file, wherein the second media file comprises advertising content, and wherein the media content of the first media file included in the one or more first segments is not included in the one or more second segments, and a third segment that includes offset data that identifies a location within the combined media file of the one or more first segments and that, during authorized rendering of the combined media file, enables rendering of the media content of the first media file without rendering the data from the second media file, wherein at least a portion of the data included in the third segment is encrypted;

wherein the third segment is inaccessible by a player for rendering when a user does not have authorization such that unauthorized rendering of the combined media file comprises rendering of both the media content from the first media file and the data of the second media file, and wherein the data of the second media file and at least a portion of the media content of the first media file of the combined media file is renderable by the player incapable of accessing the third segment; and providing the combined media file over the network to the client in response to the request, for rendering the combined media file at the client.

15. The method of claim 14 wherein the third segment includes data indicating the location of the one or more first segments within the combined media file.

16. The method of claim 15 wherein generating the combined media file further comprises including all of the media content from the first media file in the one or more first segments and including all of the advertising content from the second media file in the one or more second segments.

17. The method of claim 14 wherein generating the combined media file further comprises arranging the combined media file such that at least one of the one or more second segments precedes at least one of the one or more first segments within the combined media file.

18. The method of claim 14 wherein generating the combined media file further comprises including data from only the first media file in the one or more first segments and including data from both the first and second media files in the one or more second segments.

19. The method of claim 17 wherein generating the combined media file comprises generating a video file, and wherein:

data in the one or more first segments represents a first portion of one or more respective video frames of the video file, wherein the first portion of the one or more respective video frames comprises the consumer-desired media content; and data in the one or more second segments represents a second portion of the one or more respective video frames of the video file, wherein the second portion of the one or more respective video frames comprises the advertising content.

20. The method of claim 14 wherein generating the combined media file further comprises:
    encrypting data included in the one or more first segments; and
    including data within the third segment that relates to the decryption of the data included in the one or more first segments.

21. The method of claim 14 further comprising selecting the second media file from a plurality of available media files based on a set of criteria.

22. The method of claim 21 wherein the set of criteria includes information related to the content of the first media file.

23. The system of claim 21 wherein the set of criteria includes information related to the consumer-desired media content of the second media file.

24. The system of claim 21 wherein the set of criteria includes one or more characteristics of a user issuing the request for the first media file.

25. A system for rendering media content, comprising:
    a communication device configured to receive a combined media file having one or more first segments and one or more second segments that together include data from first and second media files, the one or more first segments comprising consumer-desired media content from the first media file and the one or more second segments comprising advertising content from the second media file, the one or more second segments mixed with the one or more first segments such that unauthorized rendering of the combined media file results in rendering of both the consumer-desired media and the advertising content,
        wherein the consumer-desired media content from the first media file included in the one or more first segments is not included in the one or more second segments, the combined media file also including a third segment that includes offset data that identifies a location within the combined media file of the one or more first segments and that, during authorized rendering of the combined media file, enables rendering the consumer-desired media content from the first media file without rendering the advertising content from the second media file, and
        wherein at least a portion of the data included in the third segment is encrypted;
    a computing device configured to render, using a processor, the combined media file based on the third segment during a first operating mode such that the consumer-desired media content from the first media file is rendered without rendering the advertising content from the second media file, and further configured to render content from both the first and second media files during a second operating mode because the third segment is inaccessible by the computing device during the second operating mode,
        wherein the computing device is further configured to set the operating mode of the computing device in response to an authorization level associated with the combined media file.

26. The system of claim 25, wherein the communication device is further configured to issue a request for the first media file.

27. The system of claim 25 wherein:
    the computing device is further configured to evaluate a license; and
    the authorization level associated with the combined media file is included in the license.

28. The system of claim 25 wherein the computing device is further configured to render a portion of the consumer-desired media content from the first media file and a portion of the advertising content from the second media file simultaneously.

29. The system of claim 25 wherein:
    the consumer-desired media content included within the first segment is encrypted; and
    the computing device is further configured to decrypt the data included within the one or more first segments.

30. The system of claim 29 wherein the computing device is further configured to decrypt the consumer-desired media content included within the one or more first segments based on information contained within the third segment.

31. The system of claim 25, wherein rendering comprises playing.

32. The system of claim 25 wherein rendering comprises copying.

33. A method for rendering media content, the method comprising:
    receiving over a network a combined media file having one or more first segments and one or more second segments that together include data from first and second media files, the one or more first segments comprising consumer-desired media content from the first media file and the one or more second segments comprising advertising content from the second media file, the one or more second segments mixed with the one or more first segments such that unauthorized rendering of the combined media file results in rendering of both the consumer-desired media content from the first media file and the advertising content,
        wherein the consumer-desired media content from the first media file included in the one or more first segments is not included in the one or more second segments, the combined media file also including a third segment that includes offset data that identifies a location within the combined media file of the one or more first segments and that, during authorized rendering of the combined media file, enables rendering of the combined media file such that the consumer-desired media content from the first media file is rendered without rendering the advertising content from the second media file, and
        wherein at least a portion of the data included in the third segment is encrypted;
    setting an operating mode in response to an authorization level associated with the combined media file; and
    rendering, using a processor, the combined media file,
        wherein rendering the combined media filed is based on the third segment if the operating mode has a first value such that the consumer-desired media content from the first media file is rendered without rendering the advertising content from the second media file, and
        wherein rendering the combined media file includes rendering content from both the first and second media files if the operating mode has a second value because the third segment is inaccessible by the computing device when the operating mode has the second value;

wherein the combined media file comprises a video file, and wherein rendering content from both the first and second media files comprises displaying consumer-desired media content from the first media file in a first portion of a video frame while displaying advertising content from the second media file on a second portion of the video frame.

34. The method of claim 33, further comprising issuing a request for the first media file.

35. The method of claim 33, further comprising evaluating a license to determine the authorization level associated with the combined media file.

* * * * *